United States Patent [19]

Shimada et al.

[11] 4,050,958
[45] Sept. 27, 1977

[54] METHOD OF REMOVING SURFACE DEFECTS OF A STEEL PRODUCT

[75] Inventors: Wataru Shimada; Seigo Hiramoto, both of Amagasaki, Japan

[73] Assignee: Mitsubishi Denki Kabushiki Kaisha, Tokyo, Japan

[21] Appl. No.: 657,941

[22] Filed: Feb. 13, 1976

[30] Foreign Application Priority Data

Feb. 28, 1975  Japan .................................. 50-25278

[51] Int. Cl.$^2$ ................................................ B23K 9/16
[52] U.S. Cl. ......................................... 148/9.5; 219/75
[58] Field of Search .................. 148/9 C, 9 R, 9.5; 219/74, 75, 121 P

[56] References Cited

U.S. PATENT DOCUMENTS

| | | | |
|---|---|---|---|
| 2,640,792 | 6/1953 | Binder | 148/9.5 |
| 2,855,337 | 10/1958 | Holub | 148/9 R |
| 3,524,040 | 8/1970 | Gage | 219/75 |
| 3,692,973 | 9/1972 | Oku et al. | 219/75 |

*Primary Examiner*—W. Stallard
*Attorney, Agent, or Firm*—Oblon, Fisher, Spivak, McClelland & Maier

[57] ABSTRACT

A method of removing surface defects from the surface of a steel product, such as a slab designed for rolling, wherein the defects are melted by an arc generated by an arc welding apparatus having a non-consumable electrode, a guide nozzle about the electrode to maintain an inert gas atmosphere immediately thereabout, and a shield nozzle about the guide nozzle to inject a mainly carbon dioxide gas therefrom, and a deoxidizer is applied to the molten pool formed in the welding operation so as to cover the surface thereof with a slag formed by the deoxidizer which is oxidized.

4 Claims, 3 Drawing Figures

METHOD OF REMOVING SURFACE DEFECTS OF A STEEL PRODUCT

BACKGROUND OF THE INVENTION

1. Fiend of the Invention

The present invention relates to a method of removing surface defects, such as cracks, on the surface of a steel product designed for rolling, such as a slab. The surface of a raw material for rolling, such as a slab and a steel block, is covered with a thick oxidized membrane and usually has many defects therein, such as, for example, cracks, having a maximum depth of about 10 mm in the surface layer.

When the raw material is rolled, such defects remain on the surface of the rolled product so as to deteriorate the quality of the rolled product.

2. Description of the Prior Art

An attempt has been made to remove such defects by a method of mechanically shaving the surface layer of the slab or the like prior to the rolling operation. However, the conventional method of removing such defects has certain disadvantages, most especially in that there is a need for many steps and the yield is remarkably decreased.

In order to overcome such disadvantages, an apparatus has been proposed for removing these surface defects of a slab by generating an arc between a non-consumable electrode and the surface of the slab in an inert gas or a reducible gas atmosphere, moving the arc by a magnetic field to melt 100% of the surface of the slab along a desirable depth and then quenching it. However, in accordance with this method, an amount of the dissolved gas in the molten surface part is increased to thus change the quality of the surface, and also blowholes are formed therein, so as to leave a non-uniform surface after the rolling operation has been completed. Accordingly, the conventional methods, while somewhat successful, have not been entirely satisfactory.

SUMMARY OF THE INVENTION

Accordingly, it is an object of the present invention to provide an improved method of removing surface defects from a steel product.

Another object of the present invention is to provide an improved method of removing surface defects of a steel product without changing the quality or the uniformity of such surface.

The present invention attains these objectives by providing a method of removing surface defects of a steel product by melting the defect parts of the surface with an arc, using an arc generator which comprises a non-consumable electrode, a guide nozzle surrounding the electrode and a shield nozzle surrounding the guide nozzle, for protecting the non-consumable electrode by discharging a protective, inert gas from the shield nozzle to shield the molten pool formed on the surface of the steel product from air and by applying a dioxide to the molten pool to conduct a deoxidizing treatment, so as to cover the surface of the molten pool with a slag formed by the deoxidizer, which is oxidized.

BRIEF DESCRIPTION OF THE DRAWINGS

Various other objects, features and attendant advantages of the present invention will be more fully appreciated as the same becomes better understood from the following detailed description, when considered in connection with the accompanying drawings, in which like reference numerals designate like or corresponding parts throughout the several figures, and wherein.

DETAILED DESCRIPTION OF THE PREFERRED EMBODIMENTS

Figure 1:
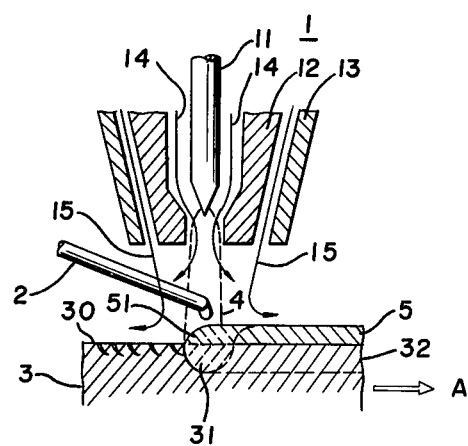
FIG. 1 is a schematic sectional view illustrating a structure and the operation of an arc welding apparatus used for the method of the present invention.

Referring now to the Drawings, and more particularly to FIG. 1, an arc generator is shown which comprises a non-consumable electrode 11, a guide nozzle 12 coaxially arranged with and surrounding the electrode and a shield nozzle 13, disposed about the guide nozzle. The arc welding apparatus also comprises means for injecting a protective gas 14, which is an inert gas, such as argon or helium, from the guide nozzle 12 and means for injecting a shield gas 15, which contains mainly carbon dioxide gas, such as carbon dioxide gas, a mixture of carbon dioxide and oxygen, a mixture of carbon dioxide and an inert gas, or a mixture of carbon dioxide, oxygen and an inert gas, from the shield nozzle. Obviously, a mechanism is provided, although not shown, for supporting the arc generator 1.

A deoxidizer 2, in the form of a rod made of silicon or manganese, is disposed between the arc generator 1 and a slab 3 having defects 30 on the surface thereof. An arc 4 is generated by applying a DC voltage from a power source, not shown, for conducting a welding operation between the slab 3 and the non-consumable electrode 11, such serving as the positive and negative electrodes, respectively. The defects on the surface of the slab 3 and the deoxidizer 2 are melted by the heat generated by the arc 4, whereby a molten pool 31 and a molten slag 51, covering the surface, are formed.

When the slab 3 is moved in the direction of the arrow line A at a predetermined velocity, the molten parts are sequentially cooled and solidified to form a solidified part 32 and slag 5. The slag 51 is formed by oxidizing the deoxidizer 2 with carbon dioxide gas or oxygen in the shield gas 15. The oxygen dissolved in the melted metal pond 31 is removed and the surface of the molten pool is covered so as to prevent permeation of oxygen or nitrogen from air.

The slag 51 has the function of decreasing surface tension of the molten pool 31, whereby the fluidity in the molten pool 31 is increased to give a smooth surface to the solidified part 32. The amount of the deoxidizer 2 should be more than the amount required for deoxidizing the oxygen dissolved in the molten pool 31. The excess part of the deoxidizer is oxidized with the carbon dioxide gas or oxygen in the shield gas 15 to form a slag without any adverse affect.

The arc generator 1 and the method of feeding the gases are not limited to those shown in FIG. 1, and the same effect can be attained, for example, by using a cylindrical electrode, whereas an electrode having a tapered configuration is illustrated.

Figure 2A:
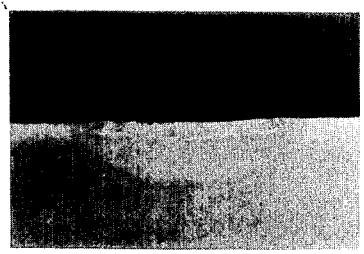
FIG. 2(a) is a photograph of a sectional view for showing the metallurgical structure of the product from which the surface defects are removed by the method of the present invention.
Figure 2B:
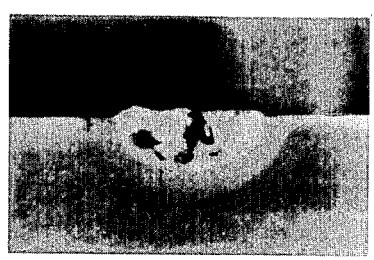
FIG. 2(b) is a photograph of a sectional view of the product treated by the conventional method.

FIG. 2(a) is a photographic illustration of a sectional view of a metallurgical structure of a slab whose surface defects have been removed by the method of the present invention, and FIG. 2(b) is a photographic illustration of a sectional view of a metallurgical structure of a slab which has been prepared by melting the surface defects by the arc without a deoxidizer and then solidifying it by cooling. The former has excellent metallurgical structure and a smooth surface, whereas the latter has large blow-holes.

In a conventional arc welding operation employing the method of the present invention, the degree for comelting into the slab 3 can be desirably selected in a range of less than about 25 mm by prolonging a heating period or by increasing the current density of the arc 4. Sometimes, the defects formed in a raw material for rolling of the slab reaches 10 and more mm in depth and it is usually preferable to remove such defects by complete melting. Accordingly, the method of removing the surface defects according to the present invention is remarkably advantageous in a practical use.

In the method of removing the surface defects according to the present invention, it is possible to visually find the surface defects of the slab 3 and to sequentially remove them. It is also possible to sequentially cause a melt treatment of all of the surface of the slab 3 with a fixed apparatus depending upon the size of the slab 3. It is also possible to conduct the method of removing the surface defects of a raw material for rolling, such as a slab, by an automatic apparatus, without manual operation, by using a device for removing the slag 5 formed on the surface of the slab by a peeling operation, such as a wire brush, prior to the rolling step.

In the description, a rod type deoxidizer 2 is used. However, the deoxidizer is not limited to such type, and can be a powder type or a granular type having the desirable volume to apply on the surface defects which are to be removed. On the polarity of the welding voltage applied between the non-consumable electrode 11 and the slab 3, the non-consumable electrode 11 is not limited to having positive polarity. It is in fact possible to give a positive polarity to the slab 3. In such case, it has been confirmed that a uniform melt of the slab results because of the arc characteristics, and the width of the molten part can be desirably controlled by controlling the behavior of the cathode spots formed on the raw material.

The case of removing the surface defects on the raw material for rolling, such as a slab, in a hot rolling or cold rolling step, has thus been illustrated. However, the method of the present invention can be applied to other cases, such as in the removal of surface defects of a steel product prepared by a forging operation, to provide advantageous results. The method of the invention imparts an especially high advantageous result when applied to a steel product which is treated to give a plastic deformation by a rolling or a forging operation, after removing the surface defects.

In accordance with the invention, in the case of removing the surface defects of a steel product, the non-consumable electrode is protected with an inert gas and an arc generator, for shielding from air a molten pool formed by the arc generated between the non-consumable electrode and the surface of the steel, is protected with a shield gas comprising mainly carbon dioxide. A deoxidizer is applied to the molten pool to deoxidize the same and the excess of the deoxidizer is oxidized with the shield gas to form a slag, so that the surface of the molten pool is covered with the slag formed with the deoxidizer. The surface of the slab from which the surface defects are removed is smooth, has no defects, such as blow-holes, and has excellent metallurgical structure by the deoxidizing effect. The surface defects can thus be removed, without loss of material of the steel product, to impart remarkable advantages in practical operations.

Obviously many modificatons and variations of the invention are possible in light of these teachings. It is therefore to be understood that within the scope of the appended claims, the present invention may be practiced otherwise than as specifically described herein. What is claimed as new and desired to be secured by Letters Patent of the United States is:

1. In a method of removing surface defects of a steel product by melting the defects of the surface with an arc, the improvement characterized by
    using an arc generator which comprises a non-consumable electrode protected with an inert gas and means for shielding a molten pool formed on the surface of the steel product from air with a shield gas, comprising mainly carbon dioxide gas, and
    applying a deoxidizer to the molten pool to deoxidize it and cover the surface of the molten pool with a slag formed therewith by the deoxidizer which is oxidized.

2. The method of removing the surface defects of a steel product according to claim 1, wherein said arc generator is a torch for arc welding which comprises:
    said non-consumable electrode;
    guide nozzle means surrounding said non-consumable electrode for discharging a protective, inert gas; and
    shield nozzle means surrounding said guide nozzle for discharging a shield gas, comprising mainly carbon dioxide gas.

3. The method of removing the surface defects of a steel product according to claim 1, wherein said deoxidizer is one of silicon and manganese.

4. The method of removing the surface defects of a steel product according to claim 3, wherein said deoxidizer is in the form of a rod.

* * * * *